United States Patent
Chen et al.

(10) Patent No.: US 11,039,470 B2
(45) Date of Patent: Jun. 15, 2021

(54) MESSAGE DECODING METHOD, TRANSMITTING END DEVICE AND RECEIVING END DEVICE

(71) Applicant: CHINA ACADEMY OF TELECOMMUNICATIONS TECHNOLOGY, Beijing (CN)

(72) Inventors: Runhua Chen, Beijing (CN); Qiubin Gao, Beijing (CN); Hui Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/606,172

(22) PCT Filed: Apr. 10, 2018

(86) PCT No.: PCT/CN2018/082472
§ 371 (c)(1),
(2) Date: Oct. 17, 2019

(87) PCT Pub. No.: WO2018/201861
PCT Pub. Date: Nov. 8, 2018

(65) Prior Publication Data
US 2020/0059958 A1 Feb. 20, 2020

(30) Foreign Application Priority Data
May 4, 2017 (CN) .......................... 201710307962.5

(51) Int. Cl.
*H04W 74/00* (2009.01)
*H04B 7/06* (2006.01)
(52) U.S. Cl.
CPC ........ *H04W 74/006* (2013.01); *H04B 7/0617* (2013.01)

(58) Field of Classification Search
CPC . H04W 72/042; H04W 48/12; H04W 68/005; H04W 36/30; H04W 52/245;
(Continued)

(56) References Cited

U.S. PATENT DOCUMENTS 10,154,535 B2 * 12/2018 Xu .................... H04W 76/25
10,327,265 B2 * 6/2019 Ly ..................... H04L 1/18
(Continued)

FOREIGN PATENT DOCUMENTS

CN 102780532 A 11/2012
CN 104380140 A 2/2015
(Continued)

OTHER PUBLICATIONS

The State Intellectual Property Office of People's Republic of China, First Office Action, Publication Date: Apr. 7, 2017, Document No. or Title: R1-1705505: <<on Beam Management for DL Control and Data Channel>>.
(Continued)

*Primary Examiner* — Khanh C Tran
(74) *Attorney, Agent, or Firm* — Flener IP & Business Law; Zareefa B. Flener

(57) ABSTRACT

The message decoding method in accordance with embodiments of the present disclosure includes: receiving, by a receiving end device, a second message associated with a first message from a transmitting end device; determining, by the receiving end device, a target receiver parameter for decoding the first message in accordance with the second message; and decoding, by the receiving end device, the first message from the transmitting end device in accordance with the target receiver parameter.

25 Claims, 6 Drawing Sheets

--- receiving, by a receiving end device, a second message associated with a first message from a transmitting end device — 201 determining, by the receiving end device, a target receiver parameter for decoding the first message in accordance with the second message — 202 decoding, by the receiving end device, the first message from the transmitting end device in accordance with the target receiver parameter — 203

(58) Field of Classification Search
CPC ..... H04W 72/14; H04W 16/28; H04W 36/36; H04W 74/006; H04L 27/261; H04B 5/0031; H04B 7/0617; H04B 7/0695; H04B 7/088
See application file for complete search history.

(56) References Cited

U.S. PATENT DOCUMENTS

| | | | |
|---|---|---|---|
| 2014/0086085 | A1 | 3/2014 | Zheng et al. |
| 2015/0009968 | A1 | 1/2015 | Yu et al. |
| 2015/0245326 | A1 | 8/2015 | Rune et al. |
| 2016/0007357 | A1 | 1/2016 | Yano et al. |
| 2016/0195603 | A1 | 7/2016 | Li |
| 2017/0302419 | A1* | 10/2017 | Liu ................... H04L 5/0091 |
| 2018/0070377 | A1 | 3/2018 | Yu |
| 2018/0132282 | A1* | 5/2018 | Ly ................... H04W 28/0215 |
| 2018/0279181 | A1* | 9/2018 | Hampel ........... H04W 36/0033 |

FOREIGN PATENT DOCUMENTS

| | | |
|---|---|---|
| CN | 105099639 A | 11/2015 |
| CN | 105379140 A | 3/2016 |
| EP | 2661033 A2 | 11/2013 |
| EP | 2993951 A1 | 3/2016 |
| WO | 2016066536 A1 | 5/2016 |

OTHER PUBLICATIONS

3GPP TSG RAN WG1 Meeting #88BIS, R1-1704398, Spokane, USA Apr. 3-7, 2017, Source: ZTE, ZTE Microelectronics, Title: Discussion on DL Beam Management, Agenda Item: 8.1.2.2.1, Document for: Discussion and Decision.

3GPP TSG RAN WG1 Meeting #88BIS, R1-1705505, Spokane, USA, Apr. 3-7, 2017, Agenda Item: 8.1.2.2.1, Source: Interdigital Communications, Title: On Beam Management for DL Control and Data Channels, Document for: Discussion and Decision.

Text of the Notification of the First Office Action, Patent Application No. 107114179, (5) Citation documents: 1.US 2016/0007357 A1, 2.US 2015/0245326 A1, 3. CN 102780532 A.

Text of the Notification of the Second Office Action, "A Method for Decoding a Message, Sending-End Equipment, and Receiving-End Equipment", before Dec. 6, 107, the Bureau notified the application of the notice of review opinion (107) Zhizhuan II (C) 04235 No. 10721156070 and amendments.

IEEE Transactions on Wireless Communications, vol. 9, No. 9, Sep. 2010, 2779, Scheduling for Multiuser MIMO Broadcast, Systems: Transmit or Receive Beamforming? Li-Chun Wang, Senior Member, IEEE, and Chu-Jung Yeh, Student Member, IEEE.

European Patent Office, Munich, Germany, dated Jul. 2, 2020, PCT/CN2018082472, China Academy of Telecommunications Technology, Communication, European Search Report.

3GPP TSG RAN WG1 Meeting #88BIS, R1-1704551, Spokane, USA Apr. 3-7, 2017, Source: CATT, Title: Details of Downlink Beam Management, Agenda Item: 8.1.2.2.1, Document for: Discussion and Decision.

3GPP TSG RAN WG1 Meeting #88BIS, R1-1704877, Spokane, USA Apr. 3-7, 2017, Agenda Item: 8.1.2.2.1, Source: LG Electronics, Title: Discussion on DL Beam Management, Document for: Discussion/Decision.

3GPP TSG RAN WG1 AH_NR Meeting, R1-1700192, Spokane, USA Jan. 16-20, 2017, Source: CATT, Title: Beam Management for Control and Data Channel, Agenda Item: 5.1.2.2, Document for: Discussion and Decision.

3GPP TSG RAN WG1 #88, R1-1702200, Athens, Greece, Feb. 13-17, 2017, Source: Intel Corporation, Title: On Beam Indication on Control and Data Channel, Agenda Item: 8.1.2.2.1, Document for: Discussion and Decision.

3GPP TSG RAN WG1 Meeting #88BIS, R1-1705212, Spokane, USA Apr. 3-7, 2017, Agenda Item: 8.1.1.4.2, Source: Sony, Title: RACH Procedure for Multi-Beam Operation, Document for: Discussion / Decision.

Patent Cooperation Treaty, Advance E-Mail PCT, Notification of Transmittal, PCT/CN2018/082472, International Filing Date: Apr. 10, 2018, Application: China Academy of Telecommunications Technology, Authorized Officer: Xin Wang, Written Opinion of the International Searching Authority.

* cited by examiner

MESSAGE DECODING METHOD, TRANSMITTING END DEVICE AND RECEIVING END DEVICE

CROSS-REFERENCE TO RELATED APPLICATION

The present application is the U.S. national phase of PCT Application No. PCT/CN2018/082472 filed on Apr. 10, 2018, which claims a priority of the Chinese patent application 201710307962.5 filed on May 4, 2017, which are incorporated herein by reference in their entirety.

TECHNICAL FIELD

The present disclosure relates to the field of communication technology, in particular to a message decoding method, a transmitting end device and a receiving end device.

BACKGROUND

Currently, along with the development of the communication technology, a communication device supports a multi-antenna system, e.g., the communication device includes up to 128, 256 or 512 antenna units and up to 128, 256 or 512 transceiver units, with each antenna unit being connected to one transceiver unit. In addition, the communication device further supports multiple beams, and different beams may have different coverage ranges. In this regard, during the transmission of a message, a transmitting end device (e.g., a network side device) may select a corresponding transmitter parameter from a plurality of transmitter parameters (e.g., transmission beams) for the transmission, so as to improve the communication performance. However, for a receiving end device (e.g., a User Equipment (UE)), there is no definite scheme about how to select a corresponding receiver parameter (e.g., a reception beam) so as to decode the message from the transmitting end device. Hence, there is an urgent need for the receiving end device to select the corresponding receiver parameter to decode the message from the transmitting end device.

SUMMARY

An object of the present disclosure is to provide a message decoding method, a transmitting end device and a receiving end device, so as to enable the receiving end device to select a corresponding receiver parameter to decode a message from the transmitting end device.

In one aspect, the present disclosure provides in some embodiments a message decoding method, including: receiving, by a receiving end device, a second message associated with a first message from a transmitting end device; determining, by the receiving end device, a target receiver parameter for decoding the first message in accordance with the second message; and decoding, by the receiving end device, the first message from the transmitting end device in accordance with the target receiver parameter.

In some possible embodiments of the present disclosure, when the second message includes parameter indication information, the target receiver parameter is a receiver parameter indicated by the parameter indication information. When the second message does not include the parameter indication information, the target receiver parameter is a default receiver parameter of the receiving end device.

In some possible embodiments of the present disclosure, the default receiver parameter of the receiving end device includes a receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

In some possible embodiments of the present disclosure, the target receiver parameter is indicated by the parameter indication information explicitly or implicitly.

In some possible embodiments of the present disclosure, when the target receiver parameter is indicated by the parameter indication information implicitly, the parameter indication information includes a transmitter parameter selected by the transmitting end device, and the receiving end device takes a receiver parameter selected by the receiving end device for the transmitter parameter in advance as the target receiver parameter.

In some possible embodiments of the present disclosure, when the second message is received within a scheduling time unit corresponding to a predetermined parameter switching indication set, the second message includes the parameter indication information, and there is a gap between the first message and the second message. When the second message is received beyond the scheduling time unit corresponding to the parameter switching indication set, the second message does not include the parameter indication information, and there is no gap between the first message and the second message.

In some possible embodiments of the present disclosure, the scheduling time unit corresponding to the parameter switching indication set occurs periodically in a time domain, and/or the scheduling time unit corresponding to the parameter switching indication set is configured by the transmitting end device in a semi-static or semi-persistent manner and notified by the transmitting end device to the receiving end device.

In some possible embodiments of the present disclosure, the first message includes a first part and a second part which are consecutive in the time domain, and the first part is located ahead of the second part. The first part and the second message are consecutive in the time domain, and the second message is located ahead of the first part. The decoding, by the receiving end device, the first message in accordance with the target receiver parameter includes: when the second message includes the parameter indication information, decoding, by the receiving end device, the second part in accordance with the target receiver parameter indicated by the parameter indication information; or when the second message includes the parameter indication information, discarding, by the receiving end device, the first part, and decoding the second part in accordance with the target receiver parameter indicated by the parameter indication information; or when the second message includes the parameter indication information, decoding, by the receiving end device, the first part in accordance with the default receiver parameter, and decoding the second part in accordance with the target receiver parameter indicated by the parameter indication information; or when the second message does not include the parameter indication information, decoding, by the receiving end device, the first part and the second part in accordance with the default receiver parameter; or when the second message includes a parameter indication field and the parameter indication field includes the parameter indication information, decoding, by the receiving end device, the second part in accordance with the target receiver parameter indicated by the parameter indication information; or when the second message includes the parameter indication field and the parameter indication field includes the parameter indication information, discarding, by the receiving end device, the first part, and decoding the second part in accordance with the target receiver parameter indicated by the parameter indication information; or when the second message includes the parameter indication field and the parameter indication field includes the parameter indication information, decoding, by the receiving end device, the first part in accordance with the default receiver parameter, and decoding the second part in accordance with the target receiver parameter indicated by the parameter indication information; or when the second message includes the parameter indication field and the parameter indication field does not include the parameter indication information or there is no parameter change, decoding, by the receiving end device, the first part and the second part in accordance with the default receiver parameter.

In some possible embodiments of the present disclosure, the message decoding method further includes receiving, by the receiving end device, a third message from the transmitting end device. The third message is used to indicate whether the second message includes the parameter indication information. When the third message indicates that the second message includes the parameter indication information, there is a gap between the first message and the second message, and when the third message indicates that the second message does not include the parameter indication information, there is no gap between the first message and the second message.

In some possible embodiments of the present disclosure, the third message is used to indicate whether the second message includes the parameter indication information within number M of time units, where M is an integer greater than or equal to 1, and the number M of time units are consecutive or inconsecutive.

In some possible embodiments of the present disclosure, the target receiver parameter includes a receiver parameter in at least one of a time domain, a frequency domain and a space domain.

In some possible embodiments of the present disclosure, the receiver parameter in the space domain includes a reception beam for the receiving end device.

In another aspect, the present disclosure provides in some embodiments a message decoding method, including: transmitting, by a transmitting end device, a second message associated with a first message to a receiving end device, the second message being used by the receiving end device to determine a target receiver parameter for decoding the first message; and transmitting, by the transmitting end device, the first message to the receiving end device.

In some possible embodiments of the present disclosure, when the second message includes parameter indication information, the target receiver parameter is a receiver parameter indicated by the parameter indication information. When the second message does not include the parameter indication information, the target receiver parameter is a default receiver parameter of the receiving end device.

In some possible embodiments of the present disclosure, the default receiver parameter of the receiving end device includes a receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

In some possible embodiments of the present disclosure, the target receiver parameter is indicated by the parameter indication information explicitly or implicitly.

In some possible embodiments of the present disclosure, when the target receiver parameter is indicated by the parameter indication information implicitly, the parameter indication information includes a transmitter parameter selected by the transmitting end device, and the receiving end device takes a receiver parameter selected by the receiving end device for the transmitter parameter in advance as the target receiver parameter.

In some possible embodiments of the present disclosure, when the second message is received within a scheduling time unit corresponding to a predetermined parameter switching indication set, the second message includes the parameter indication information, and there is a gap between the first message and the second message. When the second message is received beyond the scheduling time unit corresponding to the parameter switching indication set, the second message does not include the parameter indication information, and there is no gap between the first message and the second message.

In some possible embodiments of the present disclosure, the scheduling time unit corresponding to the parameter switching indication set occurs periodically in a time domain, and/or the scheduling time unit corresponding to the parameter switching indication set is configured by the transmitting end device in a semi-static or semi-persistent manner and notified by the transmitting end device to the receiving end device.

In some possible embodiments of the present disclosure, the first message includes a first part and a second part which are consecutive in the time domain, and the first part is located ahead of the second part. The first part and the second message are consecutive in the time domain, and the second message is located ahead of the first part.

In some possible embodiments of the present disclosure, the message decoding method further includes transmitting, by the transmitting end device, a third message to the receiving end device. The third message is used to indicate whether the second message includes the parameter indication information. When the third message indicates that the second message includes the parameter indication information, there is a gap between the first message and the second message, and when the third message indicates that the second message does not include the parameter indication information, there is no gap between the first message and the second message.

In some possible embodiments of the present disclosure, the third message is used to indicate whether the second message includes the parameter indication information within number M of time units, where M is an integer greater than or equal to 1, and the number M of time units are consecutive or inconsecutive.

In some possible embodiments of the present disclosure, the target receiver parameter includes a receiver parameter in at least one of a time domain, a frequency domain and a space domain.

In some possible embodiments of the present disclosure, the receiver parameter in the space domain includes a reception beam for the receiving end device.

In yet another aspect, the present disclosure provides in some embodiments a receiving end device, including: a first reception module configured to receive a second message associated with a first message from a transmitting end device; a determination module configured to determine a target receiver parameter for decoding the first message in accordance with the second message; and a decoding module configured to decode the first message from the transmitting end device in accordance with the target receiver parameter.

In some possible embodiments of the present disclosure, when the second message includes parameter indication information, the target receiver parameter is a receiver parameter indicated by the parameter indication information. When the second message does not include the parameter indication information, the target receiver parameter is a default receiver parameter of the receiving end device.

In some possible embodiments of the present disclosure, the default receiver parameter of the receiving end device includes a receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

In some possible embodiments of the present disclosure, the target receiver parameter is indicated by the parameter indication information explicitly or implicitly.

In some possible embodiments of the present disclosure, when the target receiver parameter is indicated by the parameter indication information implicitly, the parameter indication information includes a transmitter parameter selected by the transmitting end device, and the receiving end device takes a receiver parameter selected by the receiving end device for the transmitter parameter in advance as the target receiver parameter.

In some possible embodiments of the present disclosure, when the second message is received within a scheduling time unit corresponding to a predetermined parameter switching indication set, the second message includes the parameter indication information, and there is a gap between the first message and the second message. When the second message is received beyond the scheduling time unit corresponding to the parameter switching indication set, the second message does not include the parameter indication information, and there is no gap between the first message and the second message.

In some possible embodiments of the present disclosure, the scheduling time unit corresponding to the parameter switching indication set occurs periodically in a time domain, and/or the scheduling time unit corresponding to the parameter switching indication set is configured by the transmitting end device in a semi-static or semi-persistent manner and notified by the transmitting end device to the receiving end device.

In some possible embodiments of the present disclosure, the first message includes a first part and a second part which are consecutive in the time domain, and the first part is located ahead of the second part. The first part and the second message are consecutive in the time domain, and the second message is located ahead of the first part. The decoding module is further configured to: when the second message includes the parameter indication information, decode the second part in accordance with the target receiver parameter indicated by the parameter indication information; or when the second message includes the parameter indication information, discard the first part, and decoding the second part in accordance with the target receiver parameter indicated by the parameter indication information; or when the second message includes the parameter indication information, decode the first part in accordance with the default receiver parameter, and decode the second part in accordance with the target receiver parameter indicated by the parameter indication information; or when the second message does not include the parameter indication information, decode the first part and the second part in accordance with the default receiver parameter; or when the second message includes a parameter indication field and the parameter indication field includes the parameter indication information, decode the second part in accordance with the target receiver parameter indicated by the parameter indication information; or when the second message includes the parameter indication field and the parameter indication field includes the parameter indication information, discard the first part, and decode the second part in accordance with the target receiver parameter indicated by the parameter indication information; or when the second message includes the parameter indication field and the parameter indication field includes the parameter indication information, decode the first part in accordance with the default receiver parameter, and decode the second part in accordance with the target receiver parameter indicated by the parameter indication information; or when the second message includes the parameter indication field and the parameter indication field does not include the parameter indication information or there is no parameter change, decode the first part and the second part in accordance with the default receiver parameter.

In some possible embodiments of the present disclosure, the receiving end device further includes a second reception module configured to receive a third message from the transmitting end device. The third message is used to indicate whether the second message includes the parameter indication information. When the third message indicates that the second message includes the parameter indication information, there is a gap between the first message and the second message, and when the third message indicates that the second message does not include the parameter indication information, there is no gap between the first message and the second message.

In some possible embodiments of the present disclosure, the third message is used to indicate whether the second message includes the parameter indication information within number M of time units, where M is an integer greater than or equal to 1, and the number M of time units are consecutive or inconsecutive.

In some possible embodiments of the present disclosure, the target receiver parameter includes a receiver parameter in at least one of a time domain, a frequency domain and a space domain.

In some possible embodiments of the present disclosure, the receiver parameter in the space domain includes a reception beam for the receiving end device.

In still yet another aspect, the present disclosure provides in some embodiments a transmitting end device, including: a first transmission module configured to transmit a second message associated with a first message to a receiving end device, the second message being used by the receiving end device to determine a target receiver parameter for decoding the first message; and a second transmission module configured to transmit the first message to the receiving end device.

In some possible embodiments of the present disclosure, when the second message includes parameter indication information, the target receiver parameter is a receiver parameter indicated by the parameter indication information. When the second message does not include the parameter indication information, the target receiver parameter is a default receiver parameter of the receiving end device.

In some possible embodiments of the present disclosure, the default receiver parameter of the receiving end device includes a receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

In some possible embodiments of the present disclosure, the target receiver parameter is indicated by the parameter indication information explicitly or implicitly.

In some possible embodiments of the present disclosure, when the target receiver parameter is indicated by the parameter indication information implicitly, the parameter indication information includes a transmitter parameter selected by the transmitting end device, and the receiving end device takes a receiver parameter selected by the receiving end device for the transmitter parameter in advance as the target receiver parameter.

In some possible embodiments of the present disclosure, when the second message is received within a scheduling time unit corresponding to a predetermined parameter switching indication set, the second message includes the parameter indication information, and there is a gap between the first message and the second message. When the second message is received beyond the scheduling time unit corresponding to the parameter switching indication set, the second message does not include the parameter indication information, and there is no gap between the first message and the second message.

In some possible embodiments of the present disclosure, the scheduling time unit corresponding to the parameter switching indication set occurs periodically in a time domain, and/or the scheduling time unit corresponding to the parameter switching indication set is configured by the transmitting end device in a semi-static or semi-persistent manner and notified by the transmitting end device to the receiving end device.

In some possible embodiments of the present disclosure, the first message includes a first part and a second part which are consecutive in the time domain, and the first part is located ahead of the second part. The first part and the second message are consecutive in the time domain, and the second message is located ahead of the first part.

In some possible embodiments of the present disclosure, the transmitting end device further includes a third transmission module configured to transmit a third message to the receiving end device. The third message is used to indicate whether the second message includes the parameter indication information. When the third message indicates that the second message includes the parameter indication information, there is a gap between the first message and the second message, and when the third message indicates that the second message does not include the parameter indication information, there is no gap between the first message and the second message.

In some possible embodiments of the present disclosure, the third message is used to indicate whether the second message includes the parameter indication information within number M of time units, where M is an integer greater than or equal to 1, and the number M of time units are consecutive or inconsecutive.

In some possible embodiments of the present disclosure, the target receiver parameter includes a receiver parameter in at least one of a time domain, a frequency domain and a space domain.

In some possible embodiments of the present disclosure, the receiver parameter in the space domain includes a reception beam for the receiving end device.

In still yet another aspect, the present disclosure provides in some embodiments a receiving end device, including a processor, a transceiver, a memory, a user interface and a bus interface. The processor is configured to read a program stored in the memory so as to implement the above-mentioned message decoding method for the receiving end device.

In still yet another aspect, the present disclosure provides in some embodiments a transmitting end device, including a processor, a transceiver, a memory, a user interface and a bus interface. The processor is configured to read a program stored in the memory so as to implement the above-mentioned message decoding method for the transmitting end device.

In still yet another aspect, the present disclosure provides in some embodiments a computer-readable storage medium storing therein a computer program. The computer program is executed by a processor so as to implement the above-mentioned message decoding method for the receiving end device.

In still yet another aspect, the present disclosure provides in some embodiments a computer-readable storage medium storing therein a computer program. The computer program is executed by a processor so as to implement the above-mentioned message decoding method for the transmitting end device.

The present disclosure has the following beneficial effects. According to the embodiments of the present disclosure, the receiving end device receives the second message associated with the first message from the transmitting end device, determines the target receiver parameter for decoding the first message in accordance with the second message, and decodes the first message from the transmitting end device in accordance with the target receiver parameter. As a result, it is able for the receiving end device to determine the receiver parameter in accordance with the second message associated with the first message, and improve the message transmission performance.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
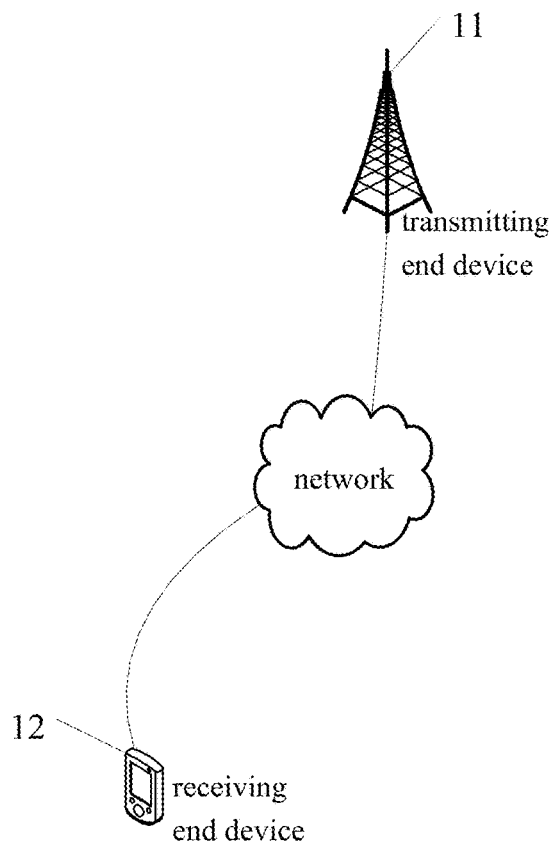
FIG. 1 is a schematic view showing an available network according to some possible embodiments of the present disclosure.

FIG. 1 shows a network to which the scheme in the embodiments of the present disclosure is applicable. As shown in FIG. 1, the network includes a transmitting end device 11 and a receiving end device 12. The transmitting end device 11 may be a base station or a terminal, and the receiving end device 12 may also be a terminal or a base station. For example, the transmitting end device 11 may be a base station, and the receiving end device 12 may be a terminal, so communication may be achieved between the terminal and the base station. For another example, the transmitting end device 11 may be a terminal, and the receiving end device 12 may be a base station, so communication may also be achieved between the terminal and the base station. For yet another example, the transmitting end device 11 may be a base station, and the receiving end device 12 may be a base station too, so communication may also be achieved between the base stations. For still yet another example, the transmitting end device 11 may be a terminal, and the receiving end device 12 maybe a terminal too, so communication may also be achieved between the terminals. Of course, in the embodiments of the present disclosure, the transmitting end device 11 may not be limited to the terminal or base station, e.g., it may also be any other network side device. Identically, the receiving end device 12 may not be limited to the terminal or base station, e.g., it may also be any other network side device. In FIG. 1, the transmitting end device 11 is the base station and the receiving end device 12 is the terminal. The terminal may be a User Equipment (UE), e.g., a mobile phone, a tablet personal computer, a laptop computer, a Personal Digital Assistant (PDA), a Mobile Internet Device (MID) or a wearable device. It should be appreciated that, the types of the terminal will not be particularly defined herein. The base station may be a micro base station (e.g., Long Term Evolution (LTE) evolved Node B (eNB), or 5$^{th}$-Generation (5G) New Radio (NR) NB), or a micro base station (e.g., a Low Power Node (LPN) pico base station, or a femto base station), or an Access Point (AP). In addition, the base station may also be a network node consisting of a Central Unit (CU) and a plurality of Transmission Reception Points (TRPs) managed and controlled by the CU. In addition, one or more cells (e.g., different frequency points or sectors) may be covered by one base station. It should be appreciated that, the types of the base station will not be particularly defined herein.

Figure 2:
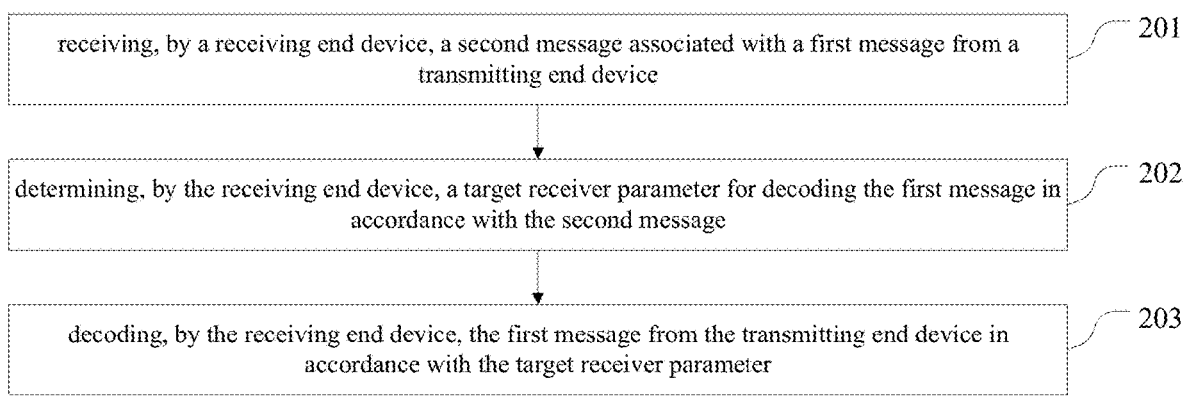
FIG. 2 is a flow chart of a message decoding method according to some possible embodiments of the present disclosure.

The present disclosure provides in some embodiments a message decoding method which, as shown in FIG. 2, includes: Step 201 of receiving, by a receiving end device, a second message associated with a first message from a transmitting end device; Step 202 of determining, by the receiving end device, a target receiver parameter for decoding the first message in accordance with the second message; and Step 203 of decoding, by the receiving end device, the first message from the transmitting end device in accordance with the target receiver parameter.

The first message may be a signal to be transmitted by the transmitting end device to the receiving end device, e.g., data and/or a control message. For example, the first message may be a downlink signal. In addition, in the embodiments of the present disclosure, the first message may be defined as msg1. The second message may be understood as a message for notifying a receiver of the receiving end device, e.g., a control message or a scheduling message. In addition, in the embodiments of the present disclosure, the second message may be defined as msg2.

The determining the target receiver parameter for decoding the first message in accordance with the second message may include, when the second message includes parameter indication information, determining a receiver parameter indicated by the parameter indication information as the target receiver parameter, and when the second message does not include the parameter indication information, determining a default receiver parameter as the target receiver parameter. In other words, in the embodiments of the present disclosure, there exist two situations for the second message. In one situation, the second message may include the parameter indication information. At this time, the receiving end device may need to switch the receiver parameter and then decode the message from the transmitting end device. In another situation, the second message may not include the parameter indication information. At this time, the receiving end device may not need to switch a beam receiver parameter, and instead it may directly decode the message from the transmitting end device. In addition, the target receiver parameter may be a parameter related to the receiver of the receiving end device, e.g., at least one of such parameters as reception beam, equalizer and receiver filter, which will not be particularly defined herein. For example, when the target receiver parameter is a target reception beam, the determining the target reception beam for decoding the first message may further include selecting one or more reception beams from a plurality of reception beams (Rx beams) for the receiving end device. A plurality of receiver parameters of the receiving end device may be irrelevant to the transmitting end device, or known to the transmitting end device. For example, the plurality of receiver parameters may be notified to the transmitting end device through pre-configuration or feedback, which will not be particularly defined herein.

In the embodiments of the present disclosure, through the above steps, it is able to notify, through the dedicated second message, the receiving end device of the reception beam for the first message from the transmitting end device. As a result, it is able for the receiving end device and the transmitting end device to acquire beam combination information in a more accurate manner, support multi-beam transmission and improve the beam transmission performance. In addition, the message decoding method in the embodiments of the present disclosure may be used for switching analog beams for the receiving end device in a wireless communication system, or switching digital beams for the receiving end device, which will not be particularly defined herein.

In some possible embodiments of the present disclosure, when the second message includes the parameter indication information, the target receiver parameter may be a receiver parameter indicated by the parameter indication information. When the second message does not include the parameter indication information, the target receiver parameter may be the default receiver parameter of the receiving end device.

During the implementation, the second message may include or not include the parameter indication information. When the second message includes the parameter indication information, the receiver parameter indicated by the parameter indication information may serve as the target receiver parameter. The reception beam indicated by the parameter indication information may be a receiver parameter different from a receiver parameter currently used by the receiving end device, and at this time, it is necessary for the receiving end device to switch the receiver parameter. When the default receiver parameter is adopted, no switching operation may be performed. For example, the default receiver parameter may be just the receiver parameter currently used by the receiving end device, so as to decode the message from the transmitting end device rapidly. In addition, in the embodiments of the present disclosure, the parameter indication information in the second message may be a parameter indication field in the second message, i.e., the second message may include or not include the parameter indication field.

For example, the default receiver parameter of the receiving end device may include the receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

During the implementation, through the above-mentioned default beam, it is able to reduce the switching operations on the receiver parameter, e.g., reduce the switching operations on the reception beam, thereby to improve the transmission performance. For example, there may exist no gap between the first message and the second message.

In the embodiments of the present disclosure, the target receiver parameter, e.g., the target reception beam, may be indicated by the parameter indication information explicitly or implicitly.

The explicit indication may be understood as direct indication. Taking the reception beam as an example, the receiving end device may be provided with a group of number L of preconfigured reception beams, which are known to the transmitting end device. In this regard, the parameter indication information may carry a field having Log 2(L) bits, so as to indicate a recommended reception beam for the receiving end device. Upon the receipt of the second message, the receiving end device may determine a corresponding reception beam for decoding msg1. The implicit indication may be understood as indirect indication. For example, the parameter indication information may indicate a transmission beam (Tx beam), and a corresponding reception beam may be implicitly indicated through the transmission beam. During the implementation, the reception beam may be flexibly indicated to the receiving end device in an explicit or implicit manner, so as to improve the system flexibility.

In some possible embodiments of the present disclosure, when the target receiver parameter is indicated by the parameter indication information implicitly, the parameter indication information may include a transmitter parameter selected by the transmitting end device, and the receiving end device may take a receiver parameter selected by the receiving end device for the transmitter parameter in advance as the target receiver parameter.

During the implementation, the receiver parameter may be indicated implicitly through the transmitter parameter. When the target receiver parameter is a target beam, the transmitting end device may be provided with number M of candidate transmission beams for downlink transmission. The transmitting end device may configure number M of reference signal (RS) resources, and each transmission beam may be applied to a corresponding RS resource. For each RS resource, the receiving end device may test one group of candidate reception beams, and determine an optimal reception beam corresponding to each RS resource (e.g., transmission beam). Optionally, the receiving end device may at least transmit information about the recommended transmission beam, e.g., in the form of recommended RS resource, to the transmitting end device. Prior to the transmission of the first message, the transmitting end device may transmit an indicator about a selected transmission beam in the form of the second message. Upon the receipt of the second message, the receiving end device may acquire the information about the used transmission beam, and acquire the optimal reception beam as the target reception beam. The optimal reception beam may be already known to the receiving end device on the basis of the previous measurement and stored in the receiving end device.

During the implementation, the receiver parameter may be indicated implicitly through the transmitter parameter, so as to facilitate the transmission between the receiving end device and the transmitting end device. Of course, in some embodiments of the present disclosure, the transmitting end device may select, on its own initiative, a corresponding transmitter parameter, e.g., a transmission beam, in accordance with recommendation information from the receiving end device.

In some possible embodiments of the present disclosure, when the second message is received within a scheduling time unit corresponding to a predetermined parameter switching indication set, the second message may include the parameter indication information, and there may exist a gap between the second message and the second message. When the second message is received beyond the scheduling time unit corresponding to the parameter switching indication set, the second message may not include the parameter indication information, and there may exist no gap between the first message and the second message.

During the implementation, the scheduling time unit corresponding to the parameter (beam) switching indication set (BSIS) may be a time unit such as subframe or slot. In addition, the BSIS may be understood by the transmitting end device and the receiving end device in a same way. The second message may carry the parameter indication information within the slot corresponding to the BSIS, otherwise the second message may carry no parameter indication information. It means that, no switching operation on the receiver parameter, e.g., the reception beam, may be performed within all slots other than the slot corresponding to the BSIS, and instead, the switching operation on the receiver parameter may be performed within slots selected periodically (e.g., within the slot corresponding to the BSIS).

In addition, when the second message includes the parameter indication information, there may exist the gap between the first message and the second message, so the receiving end device may perform the switching operation on the receiver parameter, e.g., the reception beam, within the gap, so as to prevent the transmission of the message from being adversely affected. When the second message does not include the parameter indication information, there may exist no gap between the first message and the second message, so as to save transmission resources. This is because, in this case, the receiving end device may not need to perform the switching operation on the receiver parameter, e.g., the reception beam, and thereby a decoding operation of the receiving end device may not be adversely affected by the continuous transmission of the first message and the second message. In addition, the first message and the second message may be transmitted through a same frequency-domain resource, or a same channel, which will not be particularly defined herein.

Figure 3:
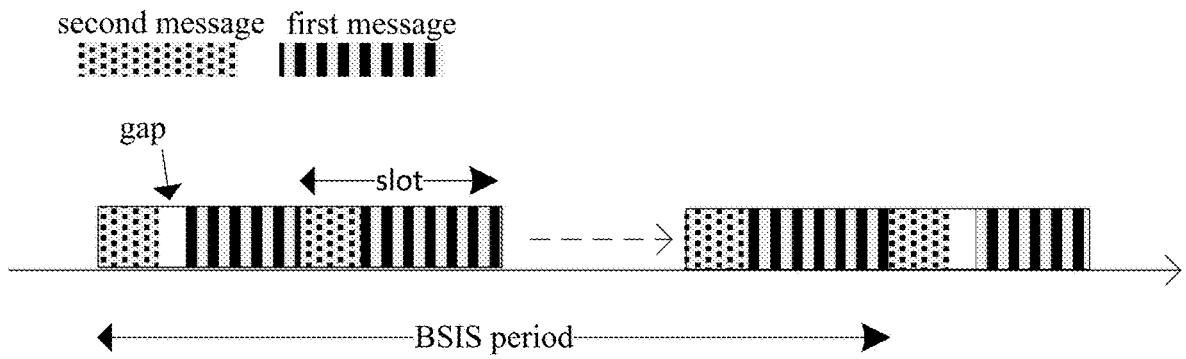
FIG. 3 is a schematic view showing the transmission of a message according to some possible embodiments of the present disclosure.

For example, the second message transmitted within the slot corresponding to the BSIS may carry the parameter indication information. In this case, there is a switching time between the first message and the second message within a same slot. Otherwise, the transmitting end device may transmit the second message not carrying a beam indication field within the slots other than the slot corresponding to the BSIS. At this time, upon the receipt of the second message, the receiving end device may receive the first message immediately (i.e., there is no gap) within a second slot as shown in FIG. 3. In addition, when the receiving end device tries to receive the second message or the first message within each slot, it may decode the second message under the presumption that the parameter indication information exists or does not exist. In other words, within the slot corresponding to the BSIS, the second message may carry the parameter indication information, and the receiving end device may try to decode the second message under the presumption that there is one piece of parameter indication information. Within the other slots, the receiving end device may decode the second message under the presumption that there is no parameter indication information. Within the slot where the second message does not carry any parameter indication information, the receiving end device may still select one receiver parameter (e.g., a reception beam) to decode the first message. To be specific, the receiving end device may use the receiver parameter indicated in the up-to-date second message carrying the parameter indication field. When the parameter indication information fails to be received, the receiving end device may decode the first message through the default receiver parameter.

In some possible embodiments of the present disclosure, the scheduling time unit corresponding to the parameter switching indication set may occur periodically in a time domain, and/or the scheduling time unit corresponding to the parameter switching indication set may be configured by the transmitting end device in a semi-static or semi-persistent manner and notified by the transmitting end device to the receiving end device.

When the scheduling time unit corresponding to the parameter switching indication set occurs periodically in the time domain, the scheduling time unit corresponding to the parameter switching indication set may be periodic. For example, the parameter switching indication set may be periodically provided with pre-configured periods and timing offsets in the time domain, and the timing offset may be an offset relative to another timing reference, e.g., a frame boundary. For example, the parameter switching indication set may be provided with a period of 10 ms, so as to indicate that the second message transmitted within one of 10 slots may carry the parameter indication information, and the second message within the other 9 slots may not carry the parameter indication information. When the scheduling time unit corresponding to the parameter switching indication set is configured by the transmitting end device in a semi-static or semi-persistent manner and notified by the transmitting end device to the receiving end device, the transmitting end device may configure a set of parameter switching indication sets in a semi-static or semi-persistent manner and notify the set to the receiving end device, i.e., the transmitting end device may indicate a plurality of parameter switching indication sets. Alternatively, the parameter switching indication set may be acquired by the receiving end device, and then recommended to the transmitting end device. The transmitting end device may use the parameter switching indication set recommended by the receiving end device, or it may cover the recommended parameter switching indication set and select a new parameter switching indication set. The transmitting end device may need to indicate the receiving end device whether to confirm the parameter switching indication set recommended by the receiving end device, or indicate the selected parameter switching indication set to the receiving end device.

In some possible embodiments of the present disclosure, the first message may include a first part and a second part which are consecutive in the time domain, and the first part may be located ahead of the second part. The first part and the second message may be consecutive in the time domain, and the second message may be located ahead of the first part. The decoding, by the receiving end device, the first message in accordance with the target receiver parameter may include: when the second message includes the parameter indication information, decoding, by the receiving end device, the second part in accordance with the target receiver parameter indicated by the parameter indication information; or when the second message includes the parameter indication information, discarding, by the receiving end device, the first part, and decoding the second part in accordance with the target receiver parameter indicated by the parameter indication information; or when the second message includes the parameter indication information, decoding, by the receiving end device, the first part in accordance with the default receiver parameter, and decoding the second part in accordance with the target receiver parameter indicated by the parameter indication information; or when the second message does not include the parameter indication information, decoding, by the receiving end device, the first part and the second part in accordance with the default receiver parameter.

During the implementation, when the first message includes the first part and the second part consecutive in the time domain, the first message may be divided by the receiving end device into two parts. Here, the first message may be considered as two parts, because, at this time, the receiving end device has not received the first message yet and it is impossible for the receiving end device to divide the first message.

For example, the transmitting end device may transmit the second message carrying downlink scheduling information associated with the reception of the first message to the receiving end device. The second message may carry or may not carry the parameter indication information, and the receiving end device may not have any apriori knowledge for this. When the second message does not include the parameter indication information, a payload of the second message may be relatively small (i.e., it may have A bits). When the second message includes the parameter indication information, the payload of the second message may be relatively large (i.e., it may have B bits, where B>A). After the second message has been transmitted by the transmitting end device, the receiving end device may try to decode the second message in a blind manner. The receiving end device is not provided with any apriori information about the payload of the second message, so it is necessary for the receiving end device to decode the second message in a blind manner in accordance with different possible payloads of the second message. For example, the receiving end device may decode the second message in a blind manner under the presumption that the payload has A bits, and decode the second message in a blind manner under the presumption that the payload has B bits. For the actual payload of the second message, the second message may be decoded successfully through the above two blind decoding operations. Then, the receiving end device may divide the first message into the first part (part 1) and the second part (part 2), the first part may be located ahead of the second part, and the first part and the second part may be multiplexed in a Time Division Multiplexing (TDM) manner in the time domain. The first part of the first message may be located immediately after the second message, i.e., there is no gap between the first part and the second message, and the second part of the first message may be located immediately after the first part, for example a second slot as shown in FIG. 4.

In addition, the first part and the second part belong to a same message, so the receiving end device may perform symbol-level processing on each of the first part and the second part.

Figure 4:
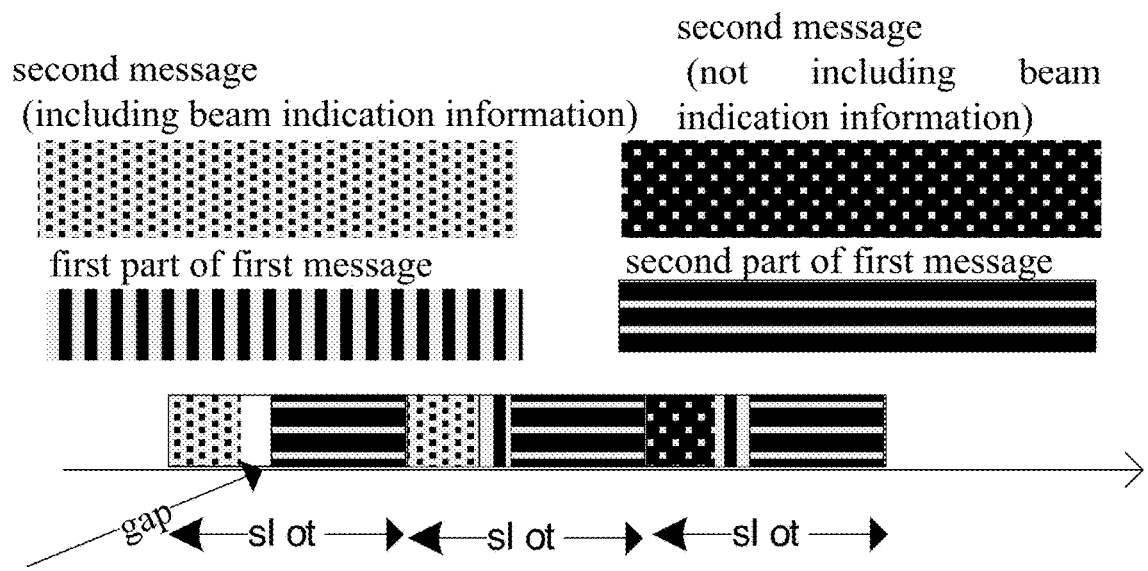
FIG. 4 is another schematic view showing the transmission of the message according to some possible embodiments of the present disclosure.

During the implementation, when the second message includes the parameter indication information, the receiving end device may decode the second part in accordance with the target receiver parameter indicated by the parameter indication information, and at this time, the transmitting end has not transmitted the first part to the receiving end device yet, for example a first lot in FIG. 4. In this way, it is able to improve the decoding accuracy of the receiving end device.

In addition, when the second message includes the parameter indication information, the first part may be discarded, and the second part may be decoded in accordance with the target receiver parameter indicated in the parameter indication information. In other words, the first part within a second slot in FIG. 4 may be discarded. At this time, it is also able to ensure the transmission performance between the transmitting end device and the receiving end device. This is because, in this case, the transmitting end device may transmit non-important information through the first part, and transmit important information through the second part. Of course, the present disclosure may not be limited thereto. When the second message includes the parameter indication information, the transmitting end device may transmit the important information through the first part, and transmit the non-important information through the second part.

In addition, when the second message includes the parameter indication information, the first part may be decoded in accordance with the default receiver parameter, and the second part may be decoded in accordance with the target receiver parameter indicated by the parameter indication information. In this way, it is able for the receiving end device to decode the first part and the second part.

In addition, when the second message does not include the parameter indication information, the first part and the second part may be decoded in accordance with the default receiver parameter, for example a third slot in FIG. 4.

In addition, the understanding of the definite decoding operation on the first message on the receiving end device by the transmitting end device may be aligned with the understanding by the receiving end device. The understanding may be configured for the receiving end device in a semi-static or semi-persistent manner through a network, or indicated to the receiving end device dynamically through another dynamic control message.

In some possible embodiments of the present disclosure, the first message includes a first part and a second part which are consecutive in the time domain, and the first part is located ahead of the second part. The first part and the second message are consecutive in the time domain, and the second message is located ahead of the first part. The decoding, by the receiving end device, the first message in accordance with the target receiver parameter includes: when the second message includes a parameter indication field and the parameter indication field includes the parameter indication information, decoding, by the receiving end device, the second part in accordance with the target receiver parameter indicated by the parameter indication information; or when the second message includes the parameter indication field and the parameter indication field includes the parameter indication information, discarding, by the receiving end device, the first part, and decoding the second part in accordance with the target receiver parameter indicated by the parameter indication information; or when the second message includes the parameter indication field and the parameter indication field includes the parameter indication information, decoding, by the receiving end device, the first part in accordance with the default receiver parameter, and decoding the second part in accordance with the target receiver parameter indicated by the parameter indication information; or when the second message includes the parameter indication field and the parameter indication field does not include the parameter indication information or there is no parameter change, decoding, by the receiving end device, the first part and the second part in accordance with the default receiver parameter.

During the implementation, the second message may include the parameter indication field, i.e., a beam indication field having number S of bits, all the time. In addition, the parameter indication field may have at least one state indicator (i.e., it may not include any parameter indication information or any state indicator indicating the parameter change), and it may also be used to indicate any other state of the receiver parameter for decoding the first message. Hence, the payload of the second message has already been known to the transmitting end device and the receiving end device in advance. For example, for four possible states of the receiver parameter (S=2), one state may be used to indicate the receiving end device that there is no parameter indication information or no parameter change, and the other three states may be used to indicate the receiver parameter of the receiving end device.

In addition, during the implementation, the description about the first part and the second part of the first message may refer to that mentioned hereinabove, and thus will not be particularly defined herein.

In addition, the description about the situations where the second message includes or does not include the parameter indication information and about how to decode the first part and the second part may refer to that mentioned hereinabove with a same or similar beneficial effect, which will thus not be particularly defined herein.

In some possible embodiments of the present disclosure, the message decoding method may further include receiving, by the receiving end device, a third message from the transmitting end device. The third message may be adopted to indicate whether the second message includes the parameter indication information. When the third message indicates that the second message includes the parameter indication information, there may be a gap between the first message and the second message, and when the third message indicates that the second message does not include the parameter indication information, there may be no gap between the first message and the second message.

The third message may be defined as msg3. During the implementation, whether the second message includes the parameter indication information, more specifically whether there is the receiver parameter change to the receiving end device, may be notified to the receiving end device through the third message. In this way, when there is no receiver parameter change or the second message does not include the parameter indication information, it is unnecessary for the receiving end device to receive the second message, and instead the receiving end device may decode the first message directly in accordance with the receive parameter currently used by the receiving end device. In addition, in some embodiments of the present disclosure, the third message may be provided with a fixed payload, and whether or not the second message includes the parameter indication information may correspond to two different states in the third message. For example, one bit in the third message may be used to indicate whether the second message carries the parameter indication information.

Figure 5:
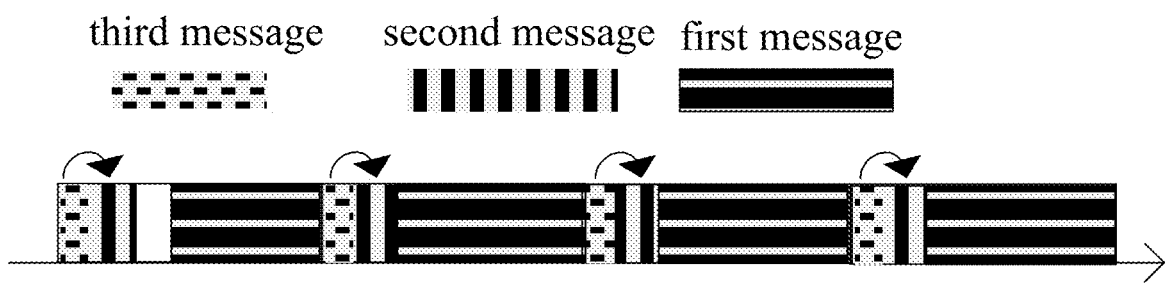
FIG. 5 is yet another schematic view showing the transmission of the message according to some possible embodiments of the present disclosure.

In addition, in the embodiments of the present disclosure, the third message may correspond to one second message, i.e., one third message may be used to indicate one second message, as shown in FIG. 5. In addition, the second message and the third message may be transmitted through a same scheduling time unit (e.g., slot), as shown in FIG. 5. Also, the second message and the third message may be transmitted through different scheduling time units. When the second message includes the parameter indication information, there may exist one gap between the first message and the second message, and when the second message does not include the parameter indication information, there may exist no gap between the first message and the second message.

In some possible embodiments of the present disclosure, the third message may be adopted to indicate whether the second message includes the parameter indication information within number M of time units, where M is an integer greater than or equal to 1, and the number M of time units may be consecutive or inconsecutive.

Figure 6:
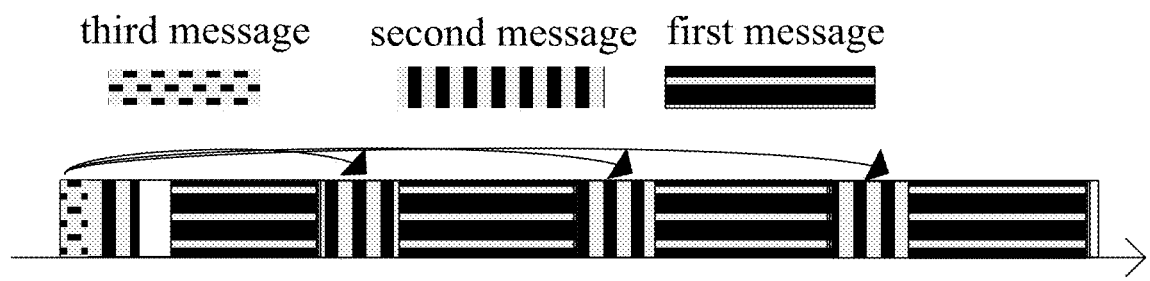
FIG. 6 is still yet another schematic view showing the transmission of the message according to some possible embodiments of the present disclosure.

During the implementation, a plurality of second messages may be indicated through the third message. For example, the third message may be adopted to indicate whether each of number M of second messages within M slots includes the parameter indication information, so as to reduce the signaling overhead. In addition, a value of M and a time position of each of the number M of second messages may be configured in a semi-static or semi-persistent manner, and they have already been known to the transmitting end device and the receiving end device. FIG. 6 shows an example, where M=3. Once upon the receipt of the third message, whether each of the second messages within the M slots carries the parameter indication information may be indicated to the receiving end device through the third message.

In addition, the third message may be transmitted within each scheduling time unit (e.g., slot) or a subset of slots preconfigured by the transmitting end device (e.g., a subset has a preconfigured transmission period and a preconfigured offset). For the latter, the transmitting end device may indicate in advance to the receiving end device that the third message is to be transmitted.

In some possible embodiments of the present disclosure, the target receiver parameter may include a receiver parameter in at least one of a time domain, a frequency domain and a space domain.

In this way, it is able to flexibly select the receiver parameter in at least one of the time domain, the frequency domain and the space domain in accordance with the second message from the transmitting end device, thereby to decode the first message. In some possible embodiments of the present disclosure, the receiver parameter in the space domain may include a reception beam for the receiving end device. Hence, the receiving end device may determine the reception beam in accordance with the second message associated with the first message, so as to improve the beam transmission performance.

It should be appreciated that, the above possible embodiments of the present disclosure may be implemented in a combined manner or separately, which will not be particularly defined herein.

According to some possible embodiments of the present disclosure, the receiving end device receives the second message associated with the first message from the transmitting end device, determines the target receiver parameter for decoding the first message in accordance with the second message, and decodes the first message from the transmitting end device in accordance with the target receiver parameter. As a result, it is able for the receiving end device to determine the receiver parameter in accordance with the second message associated with the first message, and improve the message transmission performance.

Figure 7:
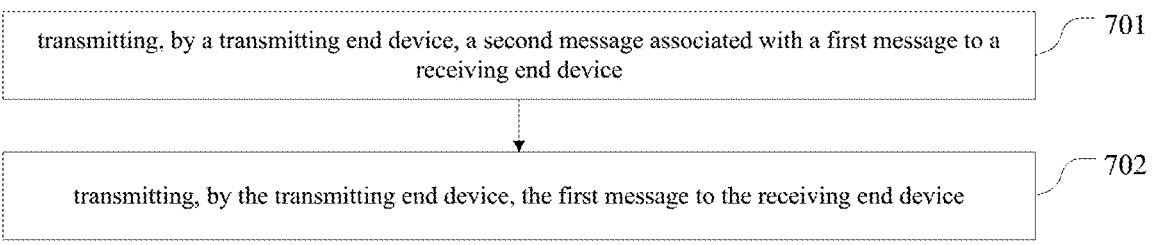
FIG. 7 is a flow chart of a message decoding method according to some possible embodiments of the present disclosure.

The present disclosure further provides a message decoding method which, as shown in FIG. 7, includes: Step 701 of transmitting, by a transmitting end device, a second message associated with a first message to a receiving end device, the second message being used by the receiving end device to determine a target receiver parameter for decoding the first message; and Step 702 of transmitting, by the transmitting end device, the first message to the receiving end device.

In some possible embodiments of the present disclosure, when the second message includes parameter indication information, the target receiver parameter may be a receiver parameter indicated by the parameter indication information. When the second message does not include the parameter indication information, the target receiver parameter may be a default receiver parameter of the receiving end device.

In some possible embodiments of the present disclosure, the default receiver parameter of the receiving end device may include a receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

In some possible embodiments of the present disclosure, the target receiver parameter may be indicated by the parameter indication information explicitly or implicitly.

In some possible embodiments of the present disclosure, when the target receiver parameter is indicated by the parameter indication information implicitly, the parameter indication information may include a transmitter parameter selected by the transmitting end device, and the receiving end device may take a receiver parameter selected by the receiving end device for the transmitter parameter in advance as the target receiver parameter.

In some possible embodiments of the present disclosure, when the second message is received within a scheduling time unit corresponding to a predetermined parameter switching indication set, the second message may include the parameter indication information, and there may exist a gap between the second message and the second message. When the second message is received beyond the scheduling time unit corresponding to the parameter switching indication set, the second message may not include the parameter indication information, and there may exist no gap between the first message and the second message.

In some possible embodiments of the present disclosure, the scheduling time unit corresponding to the parameter switching indication set may occur periodically in a time domain, and/or the scheduling time unit corresponding to the parameter switching indication set may be configured by the transmitting end device in a semi-static or semi-persistent manner and notified by the transmitting end device to the receiving end device.

In some possible embodiments of the present disclosure, the first message may include a first part and a second part which are consecutive in the time domain, and the first part may be located ahead of the second part. The first part and the second message may be consecutive in the time domain, and the second message may be located ahead of the first part.

In some possible embodiments of the present disclosure, the message decoding method may further include transmitting, by the transmitting end device, a third message to the receiving end device. The third message may be adopted to indicate whether the second message includes the parameter indication information. When the third message indicates that the second message includes the parameter indication information, there may exist a gap between the first message and the second message, and when the third message indicates that the second message does not include the parameter indication information, there may exist no gap between the first message and the second message.

In some possible embodiments of the present disclosure, the third message may be adopted to indicate whether the second message includes the parameter indication information within number M of time units, where M is an integer greater than or equal to 1, and the number M of time units may be consecutive or inconsecutive.

In some possible embodiments of the present disclosure, the target receiver parameter may include a receiver parameter in at least one of a time domain, a frequency domain and a space domain.

In some possible embodiments of the present disclosure, the receiver parameter in the space domain may include a reception beam for the receiving end device.

It should be appreciated that, the implementation of the message decoding method in the embodiments of the present disclosure may refer to the function of the transmitting end device in the above-mentioned message decoding method in FIG. 2 with a same or similar beneficial effect, and thus will not be particularly defined herein.

Figure 8:
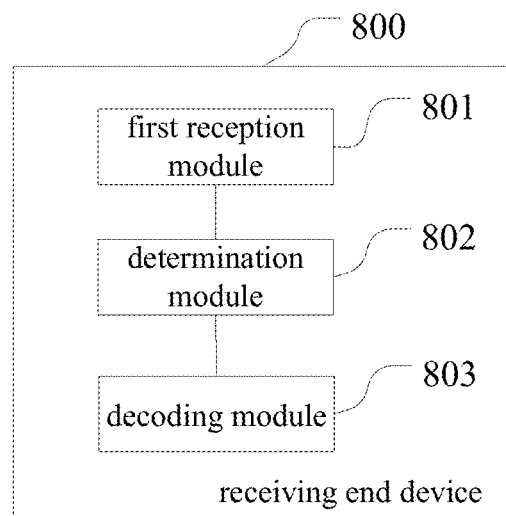
FIG. 8 is a schematic view showing a receiving end device according to some possible embodiments of the present disclosure.

The present disclosure further provides in some embodiment a receiving end device 800 which, as shown in FIG. 8, includes: a first reception module 801 configured to receive a second message associated with a first message from a transmitting end device; a determination module 802 configured to determine a target receiver parameter for decoding the first message in accordance with the second message; and a decoding module 803 configured to decode the first message from the transmitting end device in accordance with the target receiver parameter.

In some possible embodiments of the present disclosure, when the second message includes parameter indication information, the target receiver parameter may be a receiver parameter indicated by the parameter indication information. When the second message does not include the parameter indication information, the target receiver parameter may be a default receiver parameter of the receiving end device.

In some possible embodiments of the present disclosure, the default receiver parameter of the receiving end device may include a receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

In some possible embodiments of the present disclosure, the target receiver parameter may be indicated by the parameter indication information explicitly or implicitly.

In some possible embodiments of the present disclosure, when the target receiver parameter is indicated by the parameter indication information implicitly, the parameter indication information may include a transmitter parameter selected by the transmitting end device, and the receiving end device may take a receiver parameter selected by the receiving end device for the transmitter parameter in advance as the target receiver parameter.

In some possible embodiments of the present disclosure, when the second message is received within a scheduling time unit corresponding to a predetermined parameter switching indication set, the second message may include the parameter indication information, and there is a gap between the first message and the second message. When the second message is received beyond the scheduling time unit corresponding to the parameter switching indication set, the second message may not include the parameter indication information, and there may exist no gap between the first message and the second message.

In some possible embodiments of the present disclosure, the scheduling time unit corresponding to the parameter switching indication set may occur periodically in a time domain, and/or the scheduling time unit corresponding to the parameter switching indication set may be configured by the transmitting end device in a semi-static or semi-persistent manner and notified by the transmitting end device to the receiving end device.

In some possible embodiments of the present disclosure, the first message may include a first part and a second part which are consecutive in the time domain, and the first part may be located ahead of the second part. The first part and the second message may be consecutive in the time domain, and the second message may be located ahead of the first part. The decoding module 803 is further configured to: when the second message includes the parameter indication information, decode the second part in accordance with the target receiver parameter indicated by the parameter indication information; or when the second message includes the parameter indication information, discard the first part, and decoding the second part in accordance with the target receiver parameter indicated by the parameter indication information; or when the second message includes the parameter indication information, decode the first part in accordance with the default receiver parameter, and decode the second part in accordance with the target receiver parameter indicated by the parameter indication information; or when the second message does not include the parameter indication information, decode the first part and the second part in accordance with the default receiver parameter; or when the second message includes a parameter indication field and the parameter indication field includes the parameter indication information, decode the second part in accordance with the target receiver parameter indicated by the parameter indication information; or when the second message includes the parameter indication field and the parameter indication field includes the parameter indication information, discard the first part, and decode the second part in accordance with the target receiver parameter indicated by the parameter indication information; or when the second message includes the parameter indication field and the parameter indication field includes the parameter indication information, decode the first part in accordance with the default receiver parameter, and decode the second part in accordance with the target receiver parameter indicated by the parameter indication information; or when the second message includes the parameter indication field and the parameter indication field does not include the parameter indication information or there is no parameter change, decode the first part and the second part in accordance with the default receiver parameter.

Figure 9:
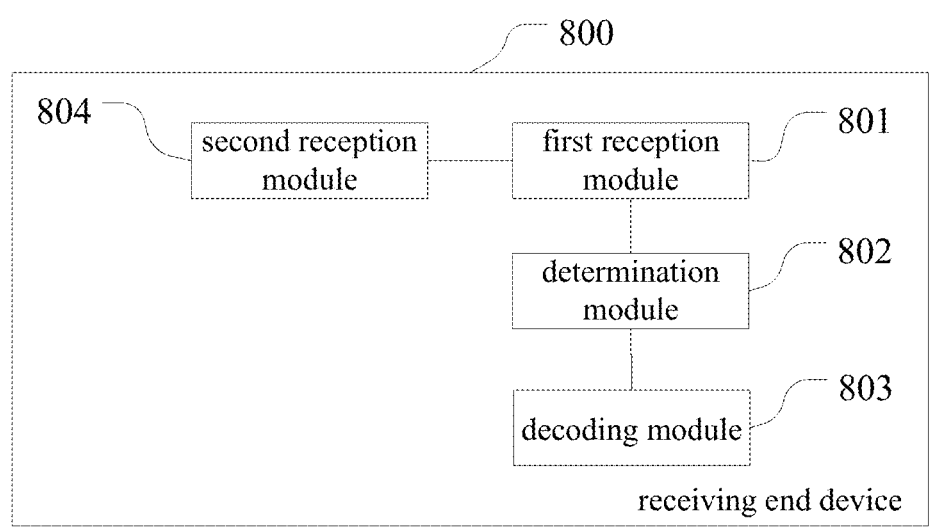
FIG. 9 is another schematic view showing the receiving end device according to some possible embodiments of the present disclosure.

In some possible embodiments of the present disclosure, as shown in FIG. 9, the receiving end device 800 may further include a second reception module 804 configured to receive a third message from the transmitting end device. The third message may be adopted to indicate whether the second message includes the parameter indication information. When the third message indicates that the second message includes the parameter indication information, there may be a gap between the first message and the second message, and when the third message indicates that the second message does not include the parameter indication information, there may be no gap between the first message and the second message.

In some possible embodiments of the present disclosure, the third message may be adopted to indicate whether the second message includes the parameter indication information within number M of time units, where M is an integer greater than or equal to 1, and the number M of time units may be consecutive or inconsecutive.

In some possible embodiments of the present disclosure, the target receiver parameter may include a receiver parameter in at least one of a time domain, a frequency domain and a space domain.

In some possible embodiments of the present disclosure, the receiver parameter in the space domain may include a reception beam for the receiving end device.

It should be appreciated that, the implementation of the receiving end device 800 in the embodiments of the present disclosure may refer to the implementation of the above-mentioned message decoding method with a same or similar beneficial effect, and thus will not be particularly defined herein.

Figure 10:
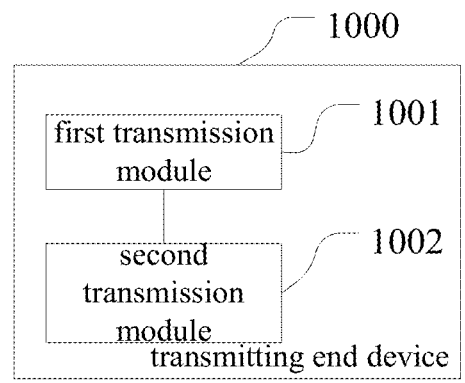
FIG. 10 is a schematic view showing a transmitting end device according to some possible embodiments of the present disclosure.

The present disclosure further provides in some embodiments a transmitting end device 1000 which, as shown in FIG. 10, includes: a first transmission module 1001 configured to transmit a second message associated with a first message to a receiving end device, the second message being used by the receiving end device to determine a target receiver parameter for decoding the first message; and a second transmission module 1002 configured to transmit the first message to the receiving end device.

In some possible embodiments of the present disclosure, when the second message includes parameter indication information, the target receiver parameter may be a receiver parameter indicated by the parameter indication information. When the second message does not include the parameter indication information, the target receiver parameter may be a default receiver parameter of the receiving end device.

In some possible embodiments of the present disclosure, the default receiver parameter of the receiving end device may include a receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

In some possible embodiments of the present disclosure, the target receiver parameter may be indicated by the parameter indication information explicitly or implicitly.

In some possible embodiments of the present disclosure, when the target receiver parameter is indicated by the parameter indication information implicitly, the parameter indication information may include a transmitter parameter selected by the transmitting end device, and the receiving end device may take a receiver parameter selected by the receiving end device for the transmitter parameter in advance as the target receiver parameter.

In some possible embodiments of the present disclosure, when the second message is received within a scheduling time unit corresponding to a predetermined parameter switching indication set, the second message may include the parameter indication information, and there is a gap between the first message and the second message. When the second message is received beyond the scheduling time unit corresponding to the parameter switching indication set, the second message may not include the parameter indication information, and there is no gap between the first message and the second message.

In some possible embodiments of the present disclosure, the scheduling time unit corresponding to the parameter switching indication set may occur periodically in a time domain, and/or the scheduling time unit corresponding to the parameter switching indication set may be configured by the transmitting end device in a semi-static or semi-persistent manner and notified by the transmitting end device to the receiving end device.

In some possible embodiments of the present disclosure, the first message may include a first part and a second part which are consecutive in the time domain, and the first part may be located ahead of the second part. The first part and the second message may be consecutive in the time domain, and the second message may be located ahead of the first part.

Figure 11:
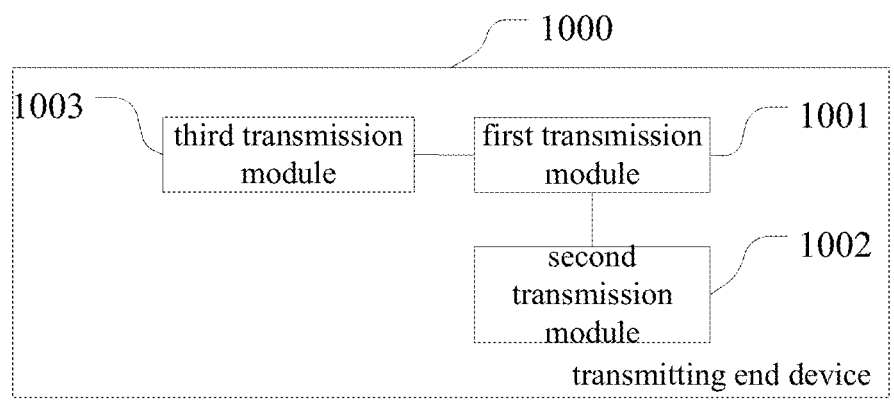
FIG. 11 is another schematic view showing the transmitting end device according to some possible embodiments of the present disclosure.

In some possible embodiments of the present disclosure, as shown in FIG. 11, the transmitting end device may further include a third transmission module 1003 configured to transmit a third message to the receiving end device. The third message may be adopted to indicate whether the second message includes the parameter indication information. When the third message indicates that the second message includes the parameter indication information, there may exist a gap between the first message and the second message, and when the third message indicates that the second message does not include the parameter indication information, there may exist no gap between the first message and the second message.

In some possible embodiments of the present disclosure, the third message may be adopted to indicate whether the second message includes the parameter indication information within number M of time units, where M is an integer greater than or equal to 1, and the number M of time units may be consecutive or inconsecutive.

In some possible embodiments of the present disclosure, the target receiver parameter may include a receiver parameter in at least one of a time domain, a frequency domain and a space domain.

In some possible embodiments of the present disclosure, the receiver parameter in the space domain may include a reception beam for the receiving end device.

It should be appreciated that, the implementation of the transmitting end device 1000 in the embodiments of the present disclosure may refer to the implementation of the above-mentioned message decoding method with a same or similar beneficial effect, and thus will not be particularly defined herein.

Figure 12:
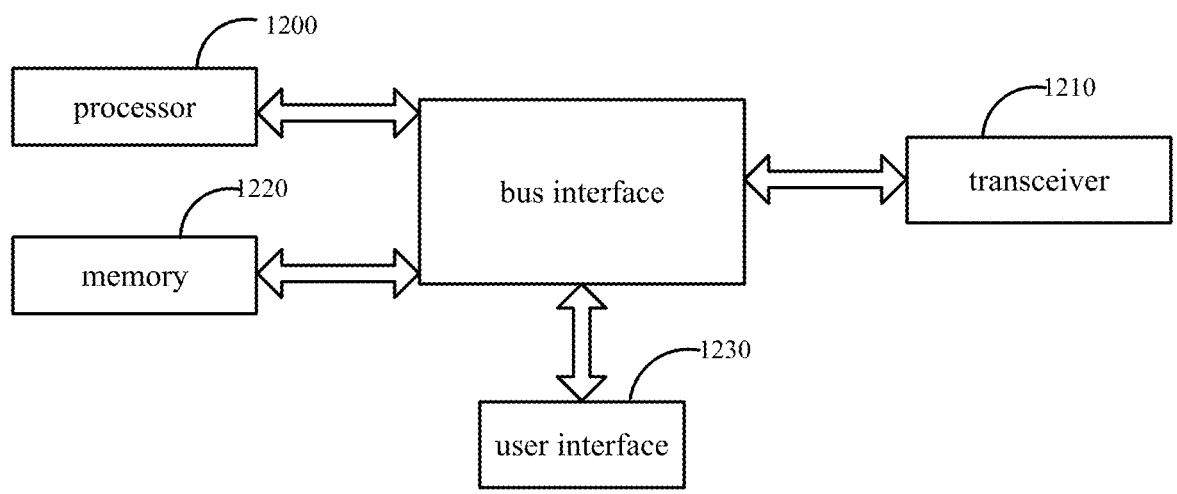
FIG. 12 is yet another schematic view showing the receiving end device according to some possible embodiments of the present disclosure.

The present disclosure further provides in some embodiments a receiving end device which, as shown in FIG. 12, includes a processor 1200, a transceiver 1210, a memory 1220, a user interface 1230 and a bus interface. The processor 1200 is configured to read a program stored in the memory 1220, so as to: receive through the transceiver 1210 a second message associated with a first message from a transmitting end device; determine a target receiver parameter for decoding the first message in accordance with the second message; and decode the first message from the transmitting end device in accordance with the target receiver parameter. The transceiver 1210 is configured to receive and transmit data under the control of the processor 1200.

In FIG. 12, bus architecture may include a number of buses and bridges connected to each other, so as to connect various circuits for one or more processors 1200 and one or more memories 1220. In addition, as is known in the art, the bus architecture may be used to connect any other circuits, such as a circuit for a peripheral device, a circuit for a voltage stabilizer and a power management circuit. The bus interface may be provided, and the transceiver 1210 may consist of a plurality of elements, i.e., a transmitter and a receiver for communication with any other devices over a transmission medium. With respect to different UEs, the user interface 1230 may also be provided for devices which are to be arranged inside or outside the UE, and these devices may include but not limited to a keypad, a display, a speaker, a microphone and a joystick. The processor 1200 may take charge of managing the bus architecture as well as general processings. The memory 1220 may store therein data for the operation of the processor 1200.

In some possible embodiments of the present disclosure, when the second message includes parameter indication information, the target receiver parameter may be a receiver parameter indicated by the parameter indication information. When the second message does not include the parameter indication information, the target receiver parameter may be a default receiver parameter of the receiving end device.

In some possible embodiments of the present disclosure, the default receiver parameter of the receiving end device may include a receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

In some possible embodiments of the present disclosure, the target receiver parameter may be indicated by the parameter indication information explicitly or implicitly.

In some possible embodiments of the present disclosure, when the target receiver parameter is indicated by the parameter indication information implicitly, the parameter indication information may include a transmitter parameter selected by the transmitting end device, and the receiving end device may take a receiver parameter selected by the receiving end device for the transmitter parameter in advance as the target receiver parameter.

In some possible embodiments of the present disclosure, when the second message is received within a scheduling time unit corresponding to a predetermined parameter switching indication set, the second message may include the parameter indication information, and there is a gap between the first message and the second message. When the second message is received beyond the scheduling time unit corresponding to the parameter switching indication set, the second message may not include the parameter indication information, and there may exist no gap between the first message and the second message.

In some possible embodiments of the present disclosure, the scheduling time unit corresponding to the parameter switching indication set may occur periodically in a time domain, and/or the scheduling time unit corresponding to the parameter switching indication set may be configured by the transmitting end device in a semi-static or semi-persistent manner and notified by the transmitting end device to the receiving end device.

In some possible embodiments of the present disclosure, the first message may include a first part and a second part which are consecutive in the time domain, and the first part may be located ahead of the second part. The first part and the second message may be consecutive in the time domain, and the second message may be located ahead of the first part. The processor 1200 is further configured to: when the second message includes the parameter indication information, decode the second part in accordance with the target receiver parameter indicated by the parameter indication information; or when the second message includes the parameter indication information, discard the first part, and decoding the second part in accordance with the target receiver parameter indicated by the parameter indication information; or when the second message includes the parameter indication information, decode the first part in accordance with the default receiver parameter, and decode the second part in accordance with the target receiver parameter indicated by the parameter indication information; or when the second message does not include the parameter indication information, decode the first part and the second part in accordance with the default receiver parameter; or when the second message includes a parameter indication field and the parameter indication field includes the parameter indication information, decode the second part in accordance with the target receiver parameter indicated by the parameter indication information; or when the second message includes the parameter indication field and the parameter indication field includes the parameter indication information, discard the first part, and decode the second part in accordance with the target receiver parameter indicated by the parameter indication information; or when the second message includes the parameter indication field and the parameter indication field includes the parameter indication information, decode the first part in accordance with the default receiver parameter, and decode the second part in accordance with the target receiver parameter indicated by the parameter indication information; or when the second message includes the parameter indication field and the parameter indication field does not include the parameter indication information or there is no parameter change, decode the first part and the second part in accordance with the default receiver parameter.

In some possible embodiments of the present disclosure, the processor 1200 is further configured to receive through the transceiver 1210 a third message from the transmitting end device. The third message may be adopted to indicate whether the second message includes the parameter indication information. When the third message indicates that the second message includes the parameter indication information, there may be a gap between the first message and the second message, and when the third message indicates that the second message does not include the parameter indication information, there may be no gap between the first message and the second message.

In some possible embodiments of the present disclosure, the third message may be adopted to indicate whether the second message includes the parameter indication information within number M of time units, where M is an integer greater than or equal to 1, and the number M of time units may be consecutive or inconsecutive.

In some possible embodiments of the present disclosure, the target receiver parameter may include a receiver parameter in at least one of a time domain, a frequency domain and a space domain.

In some possible embodiments of the present disclosure, the receiver parameter in the space domain may include a reception beam for the receiving end device.

It should be appreciated that, the receiving end device in the embodiments of the present disclosure may refer to that in FIG. 1 through FIG. 7. The implementation of the receiving end device may refer to the implementation of the receiving end device in FIG. 1 through FIG. 7 with a same or similar beneficial effect, and thus will not be particularly defined herein.

Figure 13:
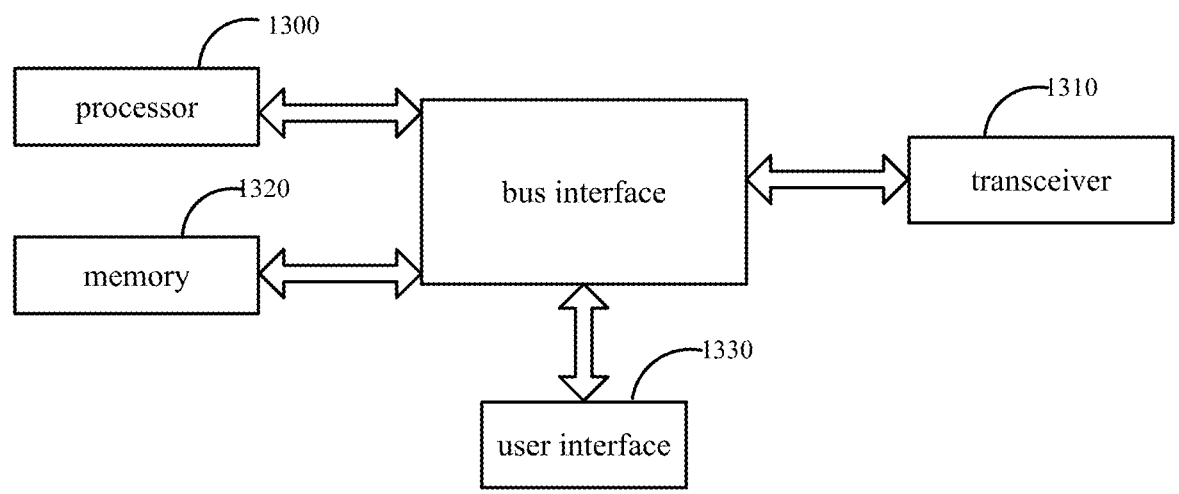
FIG. 13 is yet another schematic view showing the transmitting end device according to some possible embodiments of the present disclosure.

The present disclosure further provides in some embodiments a transmitting end device which, as shown in FIG. 13, includes a processor 1300, a transceiver 1310, a memory 1320, a user interface 1330 and a bus interface. The processor 1300 is configured to read a program stored in the memory 1320, so as to: transmit through the transceiver 1310 a second message associated with a first message to a receiving end device, the second message being used by the receiving end device to determine a target receiver parameter for decoding the first message; and transmit through the transceiver 1310 the first message to the receiving end device. The transceiver 1310 is configured to receive and transmit data under the control of the processor 1300.

In FIG. 13, bus architecture may include a number of buses and bridges connected to each other, so as to connect various circuits for one or more processors 1300 and one or more memories 1320. In addition, as is known in the art, the bus architecture may be used to connect any other circuits, such as a circuit for a peripheral device, a circuit for a voltage stabilizer and a power management circuit. The bus interface may be provided, and the transceiver 1310 may consist of a plurality of elements, i.e., a transmitter and a receiver for communication with any other devices over a transmission medium. With respect to different UEs, the user interface 1330 may also be provided for devices which are to be arranged inside or outside the UE, and these devices may include but not limited to a keypad, a display, a speaker, a microphone and a joystick. The processor 1300 may take charge of managing the bus architecture as well as general processings. The memory 1320 may store therein data for the operation of the processor 1300.

In some possible embodiments of the present disclosure, when the second message includes parameter indication information, the target receiver parameter may be a receiver parameter indicated by the parameter indication information. When the second message does not include the parameter indication information, the target receiver parameter may be a default receiver parameter of the receiving end device.

In some possible embodiments of the present disclosure, the default receiver parameter of the receiving end device may include a receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

In some possible embodiments of the present disclosure, the target receiver parameter may be indicated by the parameter indication information explicitly or implicitly.

In some possible embodiments of the present disclosure, when the target receiver parameter is indicated by the parameter indication information implicitly, the parameter indication information may include a transmitter parameter selected by the transmitting end device, and the receiving end device may take a receiver parameter selected by the receiving end device for the transmitter parameter in advance as the target receiver parameter.

In some possible embodiments of the present disclosure, when the second message is received within a scheduling time unit corresponding to a predetermined parameter switching indication set, the second message may include the parameter indication information, and there is a gap between the first message and the second message. When the second message is received beyond the scheduling time unit corresponding to the parameter switching indication set, the second message may not include the parameter indication information, and there is no gap between the first message and the second message.

In some possible embodiments of the present disclosure, the scheduling time unit corresponding to the parameter switching indication set may occur periodically in a time domain, and/or the scheduling time unit corresponding to the parameter switching indication set may be configured by the transmitting end device in a semi-static or semi-persistent manner and notified by the transmitting end device to the receiving end device.

In some possible embodiments of the present disclosure, the first message may include a first part and a second part which are consecutive in the time domain, and the first part may be located ahead of the second part. The first part and the second message may be consecutive in the time domain, and the second message may be located ahead of the first part.

In some possible embodiments of the present disclosure, the processor 1300 is further configured to transmit a third message to the receiving end device. The third message may be adopted to indicate whether the second message includes the parameter indication information. When the third message indicates that the second message includes the parameter indication information, there may exist a gap between the first message and the second message, and when the third message indicates that the second message does not include the parameter indication information, there may exist no gap between the first message and the second message.

In some possible embodiments of the present disclosure, the third message may be adopted to indicate whether the second message includes the parameter indication information within number M of time units, where M is an integer greater than or equal to 1, and the number M of time units may be consecutive or inconsecutive.

In some possible embodiments of the present disclosure, the target receiver parameter may include a receiver parameter in at least one of a time domain, a frequency domain and a space domain.

In some possible embodiments of the present disclosure, the receiver parameter in the space domain may include a reception beam for the receiving end device.

It should be appreciated that, the transmitting end device in the embodiments of the present disclosure may refer to that in FIG. 1 through FIG. 7. The implementation of the transmitting end device may refer to the implementation of the receiving end device in FIG. 1 through FIG. 7 with a same or similar beneficial effect, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A message decoding method, comprising:
   receiving, by a receiving end device, a second message associated with a first message from a transmitting end device;
   determining, by the receiving end device, a target receiver parameter for decoding the first message in accordance with the second message; and
   decoding, by the receiving end device, the first message from the transmitting end device in accordance with the target receiver parameter,
   wherein the target receiver parameter comprises at least one of such parameters as reception beam, equalizer and receiver filter.

2. The message decoding method according to claim 1, wherein when the second message comprises parameter indication information, the target receiver parameter is a receiver parameter indicated by the parameter indication information; and
   when the second message does not comprise the parameter indication information, the target receiver parameter is a default receiver parameter of the receiving end device.

3. The message decoding method according to claim 2, wherein the default receiver parameter of the receiving end device comprises a receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

4. The message decoding method according to claim 2, wherein the target receiver parameter is indicated by the parameter indication information explicitly or implicitly; and
   wherein when the target receiver parameter is indicated by the parameter indication information implicitly, the parameter indication information comprises a transmitter parameter selected by the transmitting end device, and the receiving end device takes a receiver parameter selected by the receiving end device for the transmitter parameter in advance as the target receiver parameter.

5. The message decoding method according to claim 1, wherein when the second message is received within a scheduling time unit corresponding to a predetermined parameter switching indication set, the second message comprises the parameter indication information, and there is a gap between the first message and the second message; and
   when the second message is received beyond the scheduling time unit corresponding to the parameter switching indication set, the second message does not comprise the parameter indication information, and there is no gap between the first message and the second message.

6. The message decoding method according to claim 1, wherein the first message comprises a first part and a second part which are consecutive in the time domain, and the first part is located ahead of the second part, wherein the first part and the second message are consecutive in the time domain, and the second message is located ahead of the first part, wherein the decoding, by the receiving end device, the first message in accordance with the target receiver parameter comprises:

when the second message comprises the parameter indication information, decoding, by the receiving end device, the second part in accordance with the target receiver parameter indicated by the parameter indication information; or when the second message comprises the parameter indication information, discarding, by the receiving end device, the first part, and decoding the second part in accordance with the target receiver parameter indicated by the parameter indication information; or when the second message comprises the parameter indication information, decoding, by the receiving end device, the first part in accordance with the default receiver parameter, and decoding the second part in accordance with the target receiver parameter indicated by the parameter indication information; or when the second message does not comprise the parameter indication information, decoding, by the receiving end device, the first part and the second part in accordance with the default receiver parameter; or when the second message comprises a parameter indication field and the parameter indication field comprises the parameter indication information, decoding, by the receiving end device, the second part in accordance with the target receiver parameter indicated by the parameter indication information; or when the second message comprises the parameter indication field and the parameter indication field comprises the parameter indication information, discarding, by the receiving end device, the first part, and decoding the second part in accordance with the target receiver parameter indicated by the parameter indication information; or when the second message comprises the parameter indication field and the parameter indication field comprises the parameter indication information, decoding, by the receiving end device, the first part in accordance with the default receiver parameter, and decoding the second part in accordance with the target receiver parameter indicated by the parameter indication information; or when the second message comprises the parameter indication field and the parameter indication field does not comprise the parameter indication information or there is no parameter change, decoding, by the receiving end device, the first part and the second part in accordance with the default receiver parameter.

7. The message decoding method according to claim 1, further comprising:

receiving, by the receiving end device, a third message from the transmitting end device, wherein the third message is used to indicate whether the second message comprises the parameter indication information, wherein when the third message indicates that the second message comprises the parameter indication information, there is a gap between the first message and the second message, and when the third message indicates that the second message does not comprise the parameter indication information, there is no gap between the first message and the second message.

8. The message decoding method according to claim 1, wherein the target receiver parameter comprises a receiver parameter in at least one of a time domain, a frequency domain and a space domain.

9. A message decoding method, comprising:

transmitting, by a transmitting end device, a second message associated with a first message to a receiving end device, the second message being used by the receiving end device to determine a target receiver parameter for decoding the first message; and transmitting, by the transmitting end device, the first message to the receiving end device, wherein the target receiver parameter comprises at least one of such parameters as reception beam, equalizer and receiver filter.

10. The message decoding method according to claim 9, wherein when the second message comprises parameter indication information, the target receiver parameter is a receiver parameter indicated by the parameter indication information; and when the second message does not comprise the parameter indication information, the target receiver parameter is a default receiver parameter of the receiving end device.

11. The message decoding method according to claim 10, wherein the default receiver parameter of the receiving end device comprises a receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

12. The message decoding method according to claim 10, wherein the target receiver parameter is indicated by the parameter indication information explicitly or implicitly; and wherein when the target receiver parameter is indicated by the parameter indication information implicitly, the parameter indication information comprises a transmitter parameter selected by the transmitting end device, and the receiving end device takes a receiver parameter selected by the receiving end device for the transmitter parameter in advance as the target receiver parameter.

13. The message decoding method according to claim 9, wherein when the second message is received within a scheduling time unit corresponding to a predetermined parameter switching indication set, the second message comprises the parameter indication information, and there is a gap between the first message and the second message; and when the second message is received beyond the scheduling time unit corresponding to the parameter switching indication set, the second message does not comprise the parameter indication information, and there is no gap between the first message and the second message.

14. The message decoding method according to claim 9, wherein the first message comprises a first part and a second part which are consecutive in the time domain, and the first part is located ahead of the second part, and wherein the first part and the second message are consecutive in the time domain, and the second message is located ahead of the first part.

15. The message decoding method according to claim 9, further comprising:

transmitting, by the transmitting end device, a third message to the receiving end device, wherein the third message is used to indicate whether the second message comprises the parameter indication information, and wherein when the third message indicates that the second message comprises the parameter indication information, there is a gap between the first message and the second message, and when the third message indicates that the second message does not comprise the parameter indication information, there is no gap between the first message and the second message.

16. The message decoding method according to claim 9, wherein the target receiver parameter comprises a receiver parameter in at least one of a time domain, a frequency domain and a space domain.

17. A transmitting end device, comprising a processor, a memory, and a computer program stored in the memory and executed by the processor, wherein the processor is configured to read the computer program so as to implement the message decoding method according to claim 9.

18. A receiving end device, comprising a processor, a memory, and a computer program stored in the memory and executed by the processor, wherein the processor is configured to read the computer program so as to implement a message decoding method, comprising:
  receiving, by the receiving end device, a second message associated with a first message from a transmitting end device;
  determining, by the receiving end device, a target receiver parameter for decoding the first message in accordance with the second message; and
  decoding, by the receiving end device, the first message from the transmitting end device in accordance with the target receiver parameter,
  wherein the target receiver parameter comprises at least one of such parameters as reception beam, equalizer and receiver filter.

19. The receiving end device according to claim 18, wherein when the second message comprises parameter indication information, the target receiver parameter is a receiver parameter indicated by the parameter indication information; and
  when the second message does not comprise the parameter indication information, the target receiver parameter is a default receiver parameter of the receiving end device.

20. The receiving end device according to claim 19, wherein the default receiver parameter of the receiving end device comprises a receiver parameter currently used by the receiving end device, a receiver parameter indicated by an up-to-date second message received by the receiving end device, a predefined receiver parameter, or a receiver parameter corresponding to an up-to-date transmitter parameter reported by the receiving end device to the transmitting end device.

21. The receiving end device according to claim 19, wherein the target receiver parameter is indicated by the parameter indication information explicitly or implicitly; and
  wherein when the target receiver parameter is indicated by the parameter indication information implicitly, the parameter indication information comprises a transmitter parameter selected by the transmitting end device, and the receiving end device takes a receiver parameter selected by the receiving end device for the transmitter parameter in advance as the target receiver parameter.

22. The receiving end device according to claim 18, wherein when the second message is received within a scheduling time unit corresponding to a predetermined parameter switching indication set, the second message comprises the parameter indication information, and there is a gap between the first message and the second message; and
  when the second message is received beyond the scheduling time unit corresponding to the parameter switching indication set, the second message does not comprise the parameter indication information, and there is no gap between the first message and the second message.

23. The receiving end device according to claim 18, wherein the first message comprises a first part and a second part which are consecutive in the time domain, and the first part is located ahead of the second part,
  wherein the first part and the second message are consecutive in the time domain, and the second message is located ahead of the first part,
  wherein the decoding, by the receiving end device, the first message in accordance with the target receiver parameter comprises:
  when the second message comprises the parameter indication information, decoding, by the receiving end device, the second part in accordance with the target receiver parameter indicated by the parameter indication information; or
  when the second message comprises the parameter indication information, discarding, by the receiving end device, the first part, and decoding the second part in accordance with the target receiver parameter indicated by the parameter indication information; or
  when the second message comprises the parameter indication information, decoding, by the receiving end device, the first part in accordance with the default receiver parameter, and decoding the second part in accordance with the target receiver parameter indicated by the parameter indication information; or
  when the second message does not comprise the parameter indication information, decoding, by the receiving end device, the first part and the second part in accordance with the default receiver parameter; or
  when the second message comprises a parameter indication field and the parameter indication field comprises the parameter indication information, decoding, by the receiving end device, the second part in accordance with the target receiver parameter indicated by the parameter indication information; or
  when the second message comprises the parameter indication field and the parameter indication field comprises the parameter indication information, discarding, by the receiving end device, the first part, and decoding the second part in accordance with the target receiver parameter indicated by the parameter indication information; or
  when the second message comprises the parameter indication field and the parameter indication field comprises the parameter indication information, decoding, by the receiving end device, the first part in accordance with the default receiver parameter, and decoding the second part in accordance with the target receiver parameter indicated by the parameter indication information; or
  when the second message comprises the parameter indication field and the parameter indication field does not comprise the parameter indication information or there is no parameter change, decoding, by the receiving end device, the first part and the second part in accordance with the default receiver parameter.

24. The receiving end device according to claim 18, wherein the message decoding method further comprises:

receiving, by the receiving end device, a third message from the transmitting end device, wherein the third message is used to indicate whether the second message comprises the parameter indication information, wherein when the third message indicates that the second message comprises the parameter indication information, there is a gap between the first message and the second message, and when the third message indicates that the second message does not comprise the parameter indication information, there is no gap between the first message and the second message.

25. The receiving end device according to claim 18, wherein the target receiver parameter comprises a receiver parameter in at least one of a time domain, a frequency domain and a space domain.

* * * * *